Nov. 20, 1923.

H. B. THOMPSON

1,474,951

CINEMATOGRAPHIC TARGET

Filed June 7, 1919      4 Sheets-Sheet 1

H. B. THOMPSON

CINEMATOGRAPHIC TARGET

Filed June 7, 1919

WITNESS
J. C. Mitchell

Henry B. Thompson INVENTOR

BY Frank P. Wentworth
his ATTORNEY.

Nov. 20, 1923.

H. B. THOMPSON

CINEMATOGRAPHIC TARGET

Filed June 7, 1919     4 Sheets-Sheet 4

Patented Nov. 20, 1923.

1,474,951

UNITED STATES PATENT OFFICE.

HENRY B. THOMPSON, OF NEW YORK, N. Y., ASSIGNOR TO LYDIA B. KOCH, OF NEW YORK, N. Y.

CINEMATOGRAPHIC TARGET.

Application filed June 7, 1919. Serial No. 302,444.

*To all whom it may concern:*

Be it known that I, HENRY B. THOMPSON, a citizen of the United States, residing at the borough of Manhattan, in the city, county, and State of New York, have invented certain new and useful Improvements in Cinematographic Targets, of which the following is a specification, reference being had therein to the accompanying drawings, which form a part thereof.

My invention relates to cinematographic targets and more particularly to the back plate and web feeding structure and the mechanisms appurtenant thereto for securing accuracy in marking the effectiveness of the fire.

In cinematographic targets of the type to which my invention relates, the essential characteristics thereof are a movable web of paper or other frangible, opaque material extending and having movement across the frame of the target, and forming the screen upon which the moving image is projected and against which fire is directed. Rearwardly of this screen is one, or a plurality of movable back plates adapted to receive the force of the impact of a bullet passing through the screen and to have movement thereunder, so as to either make or break an electrical circuit each time a bullet strikes the target, and thus set in motion certain other mechanisms in the machine which will have the effect of stopping the projector so as to convert the moving image to a still image and permit light rays to pass through the openings in the web formed by the bullet for a sufficient interval to permit the marker to determine the accuracy of the fire.

Heretofore there have been used three distinct types of machines so far as the paper web is concerned, in one of which a single reach of web is used, the breaks therein being closed by hand; in another of which two parallel reaches are used so that with the actuation of the web feeding mechanism, the two reaches have movement in opposite directions so as to cause each reach to close the opening made by the bullet in the other, the feeding of the web in ths type being intermittent, and either manually or mechanically effected; and in the third of which the web is fed continuously at a very low speed to impart movement to the two parallel reaches thereof and thus obscure the openings.

Where the back plate structure embodies a plurality of independently movable plates, it has heretofore been the common practice to provide a make and break mechanism associated with each plate, thus leading to a somewhat complex wiring of the apparatus with a proportionate increase in the possibilities for disarrangement of the circuits and a resultant failure of the target to properly function.

My invention relates more particularly to a type of target in which the web is continuously fed at low speed, the construction of the target and the feeding mechanism for the web being such that the speed of travel of the web may be very much reduced while securing an effective closure of the bullet openings through the various reaches of the web, thus minimizing likelihood of inaccuracy in the marking due to the holes existing in one reach registering with holes in other reaches. By reducing the speed of travel of the web, I secure economy as to the consumption thereof during a given time.

The web feeding mechanism is so constructed that the used web will be rewound upon a reel with the ragged edges of the openings formed by the bullets so smoothed out as to permit the formation of a neat roll thereof, the power acting upon the rewind reel being so applied thereto as to ensure uniformity in the speed of travel of the web, irrespective of the varying diameter of this reel.

In addition to utilizing the movement of the different reaches of the web for obscuring the bullet openings therethrough, I provide means whereby different reaches of the web will have movement with relation to each other independent of the traverse thereof imparted by the feeding mechanism, thus increasing the effectiveness of these reaches in obscuring such openings.

The light from which the rays passing through the registering bullet openings emanate, is so arranged with relation to the web passing through the machine, that a portion of this web will act as a reflector, thus securing an effective illumination at the back of the web forming the screen proper.

Other and further characteristics of the invention are the use of a single make and break mechanism common to a group of movable back plates, and the employment of baffles so arranged as to protect the various mechanisms of the machine, including the lights, from the splash of the bullets.

A target made in accordance with my invention, is so constructed and arranged as to function continuously without likelihood of its registering a hit except where a bullet passes through the screen, and of the various mechanisms therein becoming disarranged or being injured by the bullets directed against same.

The invention consists in the novel features of construction and combination of parts hereinafter set forth and described, and more particularly pointed out in the claims hereto appended.

Referring to the drawings.

Like letters refer to like parts throughout the several views.

In the embodiment of my invention shown in the drawings, the main frame of the machine 1, which is preferably made of metal, has, at the front thereof, an ordinary frame 2 within the sight opening of which the image is to be projected. The rear uprights of the frame are inclined, as shown, for the purpose of facilitating the mounting of the back plates in a manner which will be hereinafter described.

Below the frame 2, upon opposite sides of the machine, I provide suitable bearings 3 for a reel having thereon a roll 4 of web of frangible, opaque material such as paper. The web from the roll 4 passes about a guide roller 5 adjacent the bottom of the machine, then upwardly across and within the sight opening of the frame 2, over and about the guide roller 6 at the top of the machine, and about the guide roller 7 adjacent thereto, to the guide roller 8 adjacent and below the roller 5, around and about which it passes, the third reach thereof passing about the guide rollers 9 and 10 adjacent the bottom and the top of the machine respectively, thus forming three closely juxtaposed, parallel reaches 11, 12 and 13 within and extending across the sight opening of the said frame 2. Of these reaches the front one, 11, forms the screen against which the image is projected. By this construction the bullet in passing through the web makes three registering openings, the passage of light through which will indicate to the marker the accuracy of the fire.

The web is of a width greater than that of the sight opening in the frame 2, so that the bullets directed at the screen will not mutilate the edges of the web which, remaining intact, will always afford sufficient strength of material to ensure the desired feeding movement of the web.

After leaving the guide roller 10, the web passes to a rewinding reel 14 being guided in its course by the guide rollers 15, 16 and 17, the roller 17 being arranged forwardly of the roller 16, so as to provide a downwardly and forwardly inclined reach 18 extending toward the bottom of the frame 2.

The rewind reel 14 is continuously driven from the motor 19 through a suitable speed reducing mechanism, by a mechanism which will be hereinafter described, the construction and arrangement of which, however, is such as to impart a continuing lineal traverse to the web through the machine, at uniform speed, the rate of travel, in the form of the invention shown, being approximately seven feet per hour.

At the top of the machine, below the roller 15 and between the reaches 13 and 18 of the web, I mount a lamp or lamps 20 provided with a suitable reflector 21 so as to direct the rays therefrom downwardly against the reach 18, which will thus serve to reflect and diffuse the light in a manner to properly illuminate the space rearwardly of said reach 13, so that light rays will pass through registering openings made by a bullet in any part of the reaches 11, 12 and 13, within the sight opening of the frame 2.

The pulley 22 through which power is applied to the rewinding reel, is carried by the shaft of a roller 23 extending transversely of the machine and having associated therewith, and spaced away therefrom, a second roller 24 which may be either geared thereto or idly mounted. The rollers 23 and 24 are so spaced apart as to form a seat for the rewind reel 14, which reel is adapted to be frictionally driven by engagement with said roller 23 or the rollers 23 and 24. In this manner, irrespective of the diameter of the said reel 14, it will always be driven at the same peripheral speed, thus ensuring uniformity in the speed of traverse of the web 4, through the machine.

To ensure the desired frictional engagement between the reel 14 and the rollers 23 and 24, I provide various devices exerting a constant pressure upon the reel 14, these devices being so arranged as to accommodate themselves to the gradual increase in diameter of said reel 14. In addition to developing this pressure, these devices confine the said reel in its position adjacent to the rollers 23 and 24, thus facilitating the removal of the reel when it has attained the maximum size desired and the substitution of a fresh reel therefor.

The pressure developed by these devices will also tend to smooth the ragged edges about the holes made in the web and thus cause it to wind more or less compactly upon the reel 14.

One of these devices consists of a roller 25 mounted upon links 26 pivotally connected with the levers 27, which are in turn pivotally connected with the frame of the machine. The roller 25 bears upon one side of the reel 14 and imparts a thrust thereon toward the roller 24. Above the rollers 23 and 24 is a roller 28 mounted in the arms 29 pivotally supported from the frame of the machine. Passing about the rollers 24 and 28 and about the roller 30, is an endless belt 31 which conforms to the roller upon the reel 14 and is driven therefrom, or if desired, from the roller 24. To compensate for the increasing diameter of the roller upon the reel 14, the roller 30 is mounted upon pivoted arms 32.

The link 26, the lever 29 and the arm 32 are acted upon by the weight 33 by means of the cords or ropes 34, 35 and 36, the first of which passes about the pulley 37 and is connected to the lever 29, the second of which is connected directly with the link 26, and the last of which is connected directly with the lever 32. The rope 35 is connected directly with the weight 33, the ropes 34 and 36 being reaches of a continuous strand connected with said weight 33 by means of the pulley 33$^a$ about which said strand passes. This construction permits compensation for any difference in the quantity of movement of the lever arms 29 and 32. By this construction the stresses from the weight 33 are distributed about and applied to different portions of the roll while permitting the rollers 25 and 28 and the belt 31 to automatically adjust themselves to the constantly varying diameter of the roll upon the reel 14.

By thus employing three parallel reaches of the web at the sight opening of the frame 2, and imparting continuous lineal traverse thereto, two of these reaches will have simultaneous movement in the same direction, while the other will have simultaneous movement in the opposite direction. While this condition will have a tendency to rapidly obscure the bullet openings in the screen, or bring the openings in the three reaches rapidly out of register, there is always likelihood, however infrequent, of existing openings in these reaches, registering with each other at a point other than that through which a bullet passes, so as to cause a false indication of a hit.

To minimize likelihood of this condition arising, I provide means whereby in spite of uniformity in the rate of takeup of the web, the reaches 11 and 12 will have relative variable movement, thus constantly increasing or decreasing the movement of one of these reaches with relation to the other.

To secure this result, I mount the guide rollers 6 and 8 upon vertically reciprocatory distance rods 38, which rods are alternately raised and lowered by a mechanism deriving its power from the shaft of the roller 23. By this construction, as the rods 38 are raised, the rate of travel of the reach 12 will be decreased as compared with that of the reach 13 and as compared with the relative speed of the reach 11, slack in the web thus created adjacent the guide roller 8 permitting continunity in the operation of the takeup mechanism or reel 14. With the downward movement of the rods 38, the rate of travel of the guide 12 will be increased, the slack created adjacent the guide roller 6 compensating for this increased rate of movement of the reach 12, the rate of movement of said reach 12 being, during this interval, relatively greater than that of the reach 11. The rate of traverse of the reach 11 will be the same as that of the reach 13, as well as being in the same direction. Under the above conditions, the length of the reach 13, with each downward movement of the rollers 6 and 8, will be increased to an extent commensurate with the length of movement of said rollers, while the length of the reach 11 will be correspondingly decreased. The length of the reach 12 will remain constant. The relative variance in the speed of travel of the reach 12 with relation to the reaches 11 and 13 will have the effect of minimizing any tendency of old openings in the different reaches of webs being brought into register in a manner to cause false marking of the effect of the shock.

In securing the desired results, I employ a mechanism for imparting movement to the rods 38 which will convert the rotary movement of the roller 23 into a reciprocatory movement, without any substantial variance in the speed of said rods, or without any dead centers or intervals of rest when changing the direction of movement of the rods.

Figure 9:
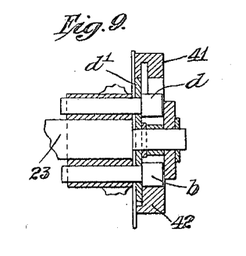
Figure 10:
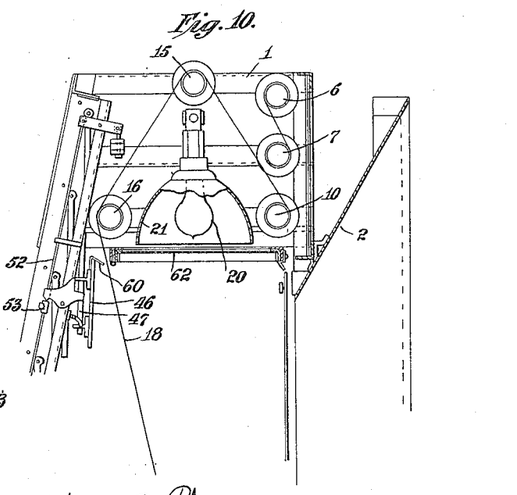
Fig. 10 is a detailed view of the upper part of the structure showing the illuminating lamp and the parts appurtenant thereto.
Figure 11:
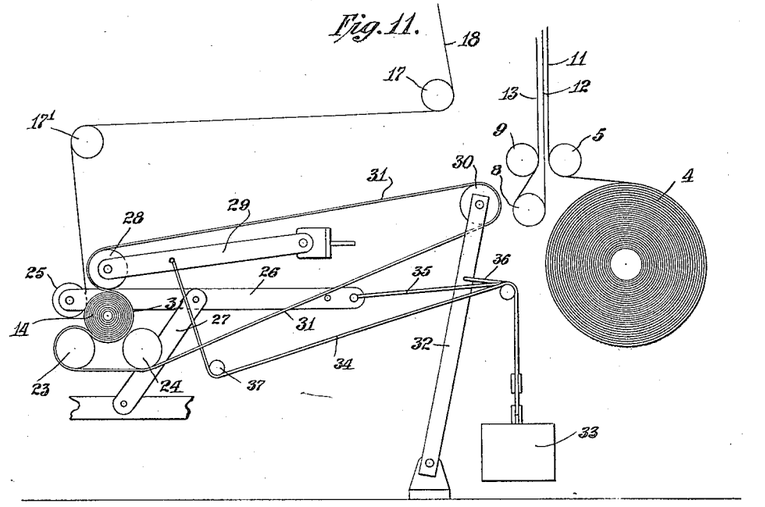
Fig. 11 is an enlarged view of the rewinding reel mechanism.

This mechanism comprises a bell crank lever 39 associated with each of the rods 38, one arm of each of which is operatively connected therewith so as to compensate for the arc described thereby. The other arm of said lever is pivotally connected with a pitman 40 having pivotally connected therewith oppositely disposed hooks 41 and 42, the heels of which are acted upon by the spring 43. Carried by the shaft of the roller 23 are four studs, $a$, $b$, $c$, and $d$ arranged 90° apart on a circle concentric with the axis of said shaft, the studs $a$ and $c$ being adapted to co-operate with the hook 41 imparting movement to the pitman 40, while the studs $b$ and $d$ co-operate with the hook 42 imparting movement to said pitman in the opposite direction. The hook 41 is provided with a bevel 44 with which the studs $b$ and $d$ co-operate in disconnecting the hook 41 from its co-operating power applying stud at the limit of the operative movement of the stud thereon, the hook 42 being provided with a similar bevel 45 with which the studs $a$ and $c$ co-operate with a similar operative effect. The studs $a$ and $c$ are carried by one arm $d'$, while the studs $b$ and $d$ are carried by a similar arm, these arms being arranged on parallel planes. The hook 41 is slotted to receive the arm $d'$ carrying the studs $a$ and $c$, thus permitting the hook 41 to engage both of said studs. The hook 42 is provided with a similar slot upon a parallel plane, adapted to receive the arm carrying the studs $b$ and $d$, and thus permitting both of these studs to engage said hook. Since the slots, which are clearly shown in Fig. 9, are upon different planes, it follows that the ends of the arm carrying the studs $b$ and $d$ will prevent engagement of the hook 41 with either of said studs, since it will engage the face of said hook at one side of said recess. The same condition prevails in connection with the hook 42 and the arm carrying the studs $a$ and $c$.

Figure 1:
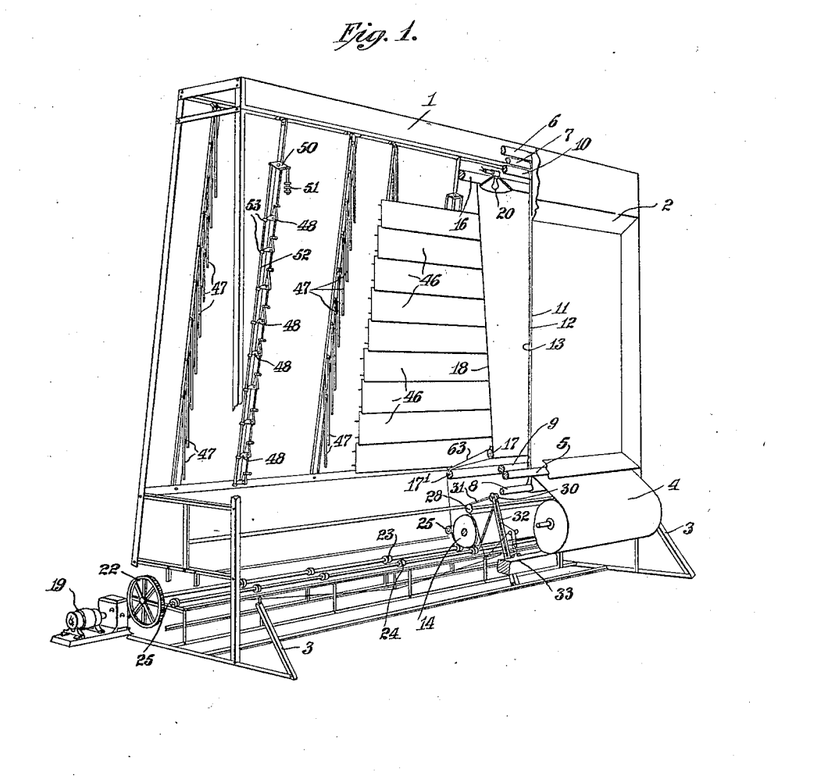
Fig. 1 is a perspective view of a cinematographic target structure embodying my invention, with portions thereof broken away and other portions thereof removed, to disclose the relation of the various parts.
Figures 2, 3, 4:
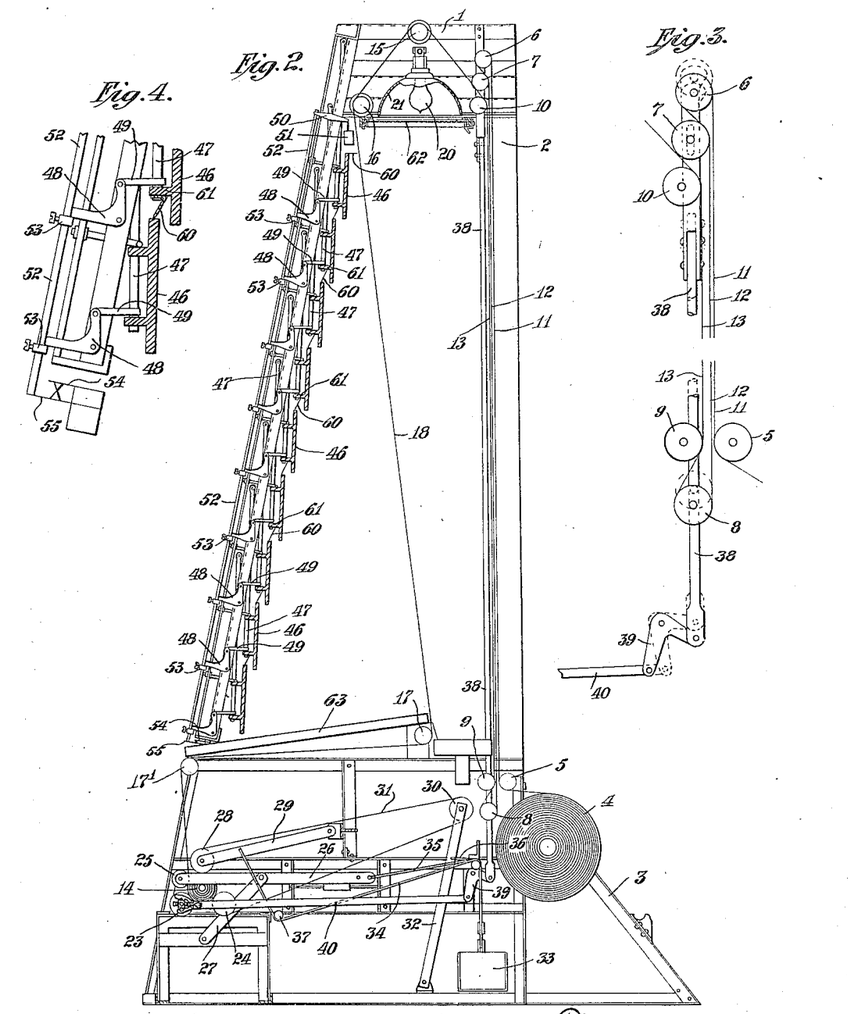
Fig. 2 is a side view of the target structure with the frame removed.
Fig. 3 is a detailed, fragmentary view showing that portion of the web feeding mechanism by which different reaches thereof have relative variable movement with a constant speed of takeup of the web by the rewinding reel.
Fig. 4 is a detailed, fragmentary view of one of the make and break mechanisms, with its associated back plates.
Figure 5:
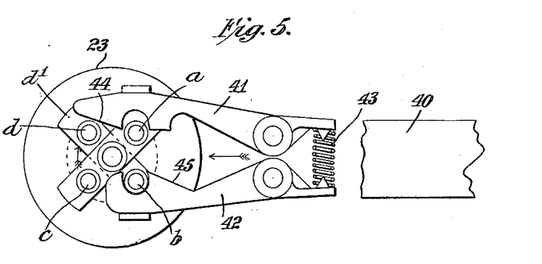
Figs. 5, 6, 7, 8 and 9 are detailed views showing the actuating means for the mechanism shown in Fig. 3, at different stages of the operation thereof.
Figure 6:
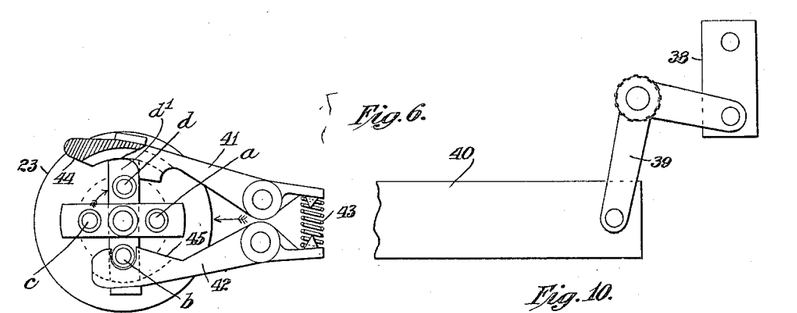
Figure 7:
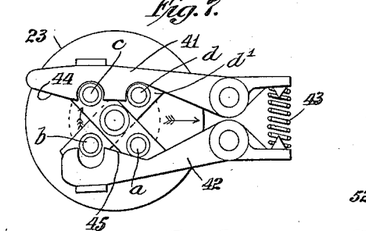
Figure 8:
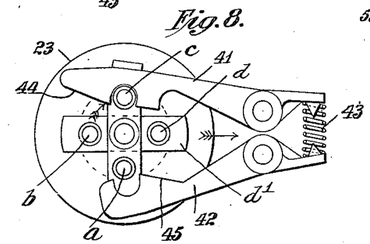

In Figs. 5 to 8, I have illustrated the four different operative positions of this mechanism, Fig. 5 illustrating the relation of parts at the interval of the disconnection of the hook 41 from the stud $a$ and the connection of the hook 42 with the stud $b$, this being the position when the rods 38 have reached their uppermost position. With the continued rotation of the studs, the pitman 40 will be moved to the left, the stud $d$ continuing its lifting action upon the hook 41 and tensioning the spring 43 in a manner to maintain the desired engagement with the stud $b$. With this movement the arm $d'$ supporting the stud $d$ will engage the hook 41 until the stud passes to the position shown in Fig. 7, at which interval the stud $a$ will engage the bevel 45 upon the hook 42, thus disengaging said hook from the stud $b$. At the same time the hook 41 will engage the stud $c$ and thus reverse the movement of the pitman, the arm $d'$ supporting the stud $a$ preventing said stud from operatively engaging the hook 42 during this interval.

By this construction I secure about seventy per cent of the effective throw of the rotating member and avoid any substantial slowing-down and no dead centers in the operation of the pitman, thus ensuring a quick reversal in the direction of movement of the rods 38 and a complete elimination of a possibility of the failure of the variable speed of the reaches 11 and 12 at any time when a bullet happens to strike same.

Carried by the inclined uprights at the back of the frame 1, are a plurality of groups of back plates, the adjacent plates of each group overlapping each other upon a horizontal plane and overlapping the plates of the adjacent group upon a vertical plane so as to afford no dead spaces about the plates and thus ensure the actuation of this back plate mechanism with the impact of every bullet therewith.

The construction and arrangement of each plate is similar to every other, and a description of but one of them is therefore necessary. Each group of back plates is composed of a plurality of pendulous metal plates 46 pivotally supported by means of the rods 47. Back of each plate 46 is a bell crank lever 48, one arm of which is connected by a link 49 with its co-operating back plate.

Adjacent the top of each group of back plates 46 is a walking beam 50, one arm of which has suspended therefrom a weight 51 while the other arm thereof is pivotally connected with a reciprocatory switch actuating rod 52 slidably mounted in suitable bearings in the frame 1. Said rod has thereon a plurality of blocks 53 arranged one adjacent each lever 48 in position to be operatively engaged by one arm thereof so that the rod 52 may be actuated to control the back plate circuit by every plate of the group with which it is associated. Preferably the various blocks 53 are adjustably mounted upon the rod 52 to permit all of said blocks to be similarly positioned in relation to its co-operating lever.

Below and within the operative range of each rod 52 is a make and break mechanism consisting of the opposed electrical contacts 54 and 55, one of which as 54 is a spring contact which the rod 52 engages when thrust downwardly, so as to either open or close the circuit controlled by the back plate structure, according to the wiring system employed.

Figure 12:
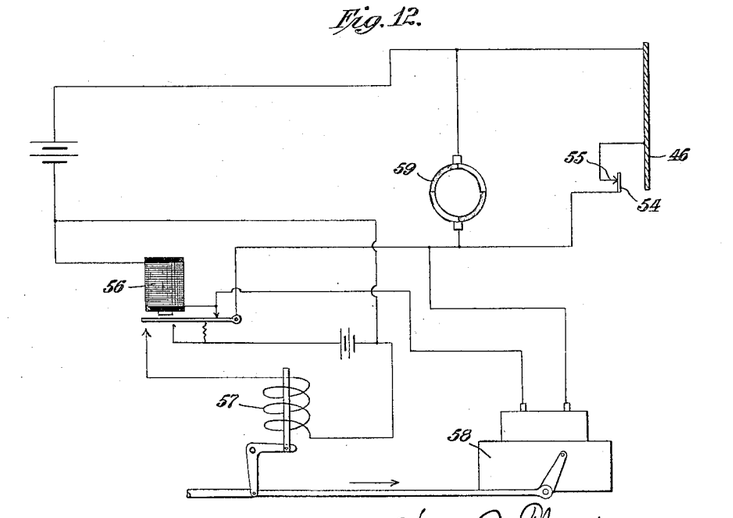
Fig. 12 is a diagrammatic view of the wiring of the apparatus.

In Fig. 12, I have shown diagrammatically a conventional system of wiring, the target in which the opening of the normally closed primary circuit through the contacts 54—55 de-energizes the magnet of a relay 56, thus closing a secondary circuit to a solenoid 57 which actuates through mechanical connections, the projector stop device and other mechanisms about the machine. Arranged in a shunt circuit from the secondary circuit is a timing device 58, which also includes therein the relay 56. I also employ a rotary switch 59 actuated in synchronism with the projector, and arranged in the primary circuit so as to time the de-energizing of the solenoid with relation to the feeding of the film.

To protect the various mechanisms in and about the back plate structure from the splash of the bullets directed against the various back plates 46, I provide each of said plates with a shield 60 extending from the top thereof towards and in close juxtaposition to and below a cross rib 61 upon the adjacent upper plate of the same group, the shield on the uppermost plate 46 projecting into close proximity to the reach 18. These shields may be of light sheet metal since they are required to withstand only a glancing impact of spent bullets or fragments thereof. The reach 18 will also serve to protect the reaches 11, 12 and 13 from the splash of the bullets.

Below each reflector 21, I provide a light permeable screen 62 which will protect it and the lamp from the splash of the bullets.

Above the rewind mechanism and below the various groups of back plates is a salvage pan 63 adapted to receive the bullets as they drop after impact with the said back plates.

The operation of the herein described target structure is substantially as follows:—

While the target is in operation the primary circuit to the relay 56 is closed, the rotary switch 59 being connected in multiple with the contacts 54—55, ensuring continuity in the flow of the current to said relay until a picture is properly framed.

The web from the roll 4 will be continuously fed through the machine by the rewind mechanism actuated from the roller 23, thus permitting, if desired, the entire exhaustion of the supply of the web upon the roll 4 before stopping the machine. The impossibility of rewinding the web, however, in as compact form as in the original roll, by reason of the ragged tears therein, makes it desirable to remove the reel 14 when only a portion of the web has been rewound thereon, in order to avoid excessive bulk in the waste paper rolls.

While the web is moving through the machine, the reaches 11 and 13 will be moving upwardly, while the intermediate reach 12 will be moving downwardly, thus ensuring a rapid closure of openings made by the bullet through the three reaches, the variable speed of the intermediate reach 12 with relation to the reaches 11 and 13, heretofore described in detail, ensuring a constant change in the relation of said reaches, so as to ensure the closing of these openings and prevent the accidental registering of openings made in said reaches by different bullets.

While the electrical conditions are as above described, the projector will be operative to direct a moving image upon the screen.

When fire is directed against this image, the bullet will pass through the reaches 11, 12 and 13, thus permitting light emanating from the lamp 20 and reflected from the reach 18 to be visible from the front of the target and permit accuracy in the marking of the fire.

Substantially simultaneously with the passage of the bullet through the screen reaches, it will impact with some pendulous plate 46, the force of the impact, even with a small caliber, low power projectile being sufficient to force the back plate 46 rearwardly. This causes the link 49 of said plate to actuate the bell crank lever 48 associated therewith, to force the rod 52 downwardly, thus momentarily opening the primary circuit and closing the secondary circuit to the solenoid 57, the actuation of which will instantly stop the projector and convert the moving image to a still image, before the movement of the web has been sufficient to close the registering openings in the screen reaches.

While the back plate 46 will immediately return to normal, thus again causing the contacts 54 and 55 to reengage, this movement will not close the primary circuit, since this can be done only through the relay 56, the reenergizing of which is by said secondary circuit which is controlled by the timer 58 arranged in the shunt circuit of said secondary circuit. The actuation of the timer, however, will, after a predetermined interval coincident with or subsequent to the closing of the registering bullet openings through the screen reaches, close the secondary circuit to the relay, thus restoring the electrical conditions and restarting the projector.

This operation of the back plate mechanism in controlling the projector would be the same, irrespective of what back plate a bullet may strike, the back plate of each group acting similarly upon the rod 52 associated therewith, and the rod 52 of each group acting similarly upon its make and break mechanism controlling the primary circuit.

Actual experience has demonstrated that a continuously moving web having slow traverse, is highly effective in obscuring the bullet openings made through the screen, since with rapidly succeeding shots the inertia of parts is sufficiently great to make an intermittent feeding movement of the web impracticable and unsatisfactory.

In a target constructed in accordance with my invention, the various parts are so constructed and arranged that the target may be operated continuously without likelihood of any such disarrangement of parts as will necessitate even a temporary shut-down. The various mechanisms are so protected from the spent bullets or from fragments thereof, that they cannot become clogged.

It is not my intention to limit the invention to the precise details of construction shown in the accompanying drawings, it being apparent that such may be varied without departing from the spirit and scope of the invention.

Having described the invention, what I claim as new and desire to have protected by Letters Patent, is:—

1. A cinematographic target embodying therein a roll of continuous web passed in a plurality of substantially parallel reaches across the sight opening of a target, means imparting lineal traverse to said web, a movable back plate adapted to receive the force of the impact of a bullet after it passes through the reaches of said web, a relay, electrical contacts included in circuit with said relay and adapted to be actuated by said movable back plate, electrically actuated means, adapted to be operatively connected with the projector, included in a secondary circuit having therein contacts controlled by said relay including an electric make and break mechanism, and a timing device arranged in said secondary circuit, and also in circuit with said relay, whereby the actuation of said contacts by said back plate will actuate said relay to cause the mechanisms in said secondary circuit to convert a moving image to a still image, substantially simultaneously with the impact of a bullet with the screen, and to restart the projector independently of the contacts actuated by said plate.

2. A cinematographic target embodying therein a roll of continuous web passed in a plurality of substantially parallel reaches across the sight opening of a target, means imparting lineal traverse to said web, a movable back plate adapted to receive the force of the impact of a bullet after it passes through the reaches of said web, a relay, electrical contacts included in circuit with said relay and adapted to be actuated by said movable back plate, said contacts being normally engaged to close said circuit, electrically actuated means, adapted to be operatively connected with the projector, included in a secondary circuit having therein contacts controlled by said relay including an electric make and break mechanism, and a timing device arranged in said secondary circuit, and also in circuit with said relay, whereby the actuation of said contacts by said back plate will actuate said relay to cause the mechanisms in said secondary circuit to convert a moving image to a still image, substantially simultaneously with the impact of a bullet with the screen, and to restart the projector independently of the contacts actuated by said plate.

3. A cinematographic target embodying therein a roll of continuous web passed in a plurality of substantially parallel reaches across the sight opening of a target, means imparting continuous lineal traverse to said web at low speed, a movable back plate adapted to receive the force of the impact of a bullet after it passes through the reaches of said web, a relay, electrical contacts included in circuit with said relay and adapted to be actuated by said movable back plate, electrically actuated means, adapted to be operatively connected with the projector, included in a secondary circuit having therein contacts controlled by said relay including an electric make and break mechanism, and a timing device arranged in said secondary circuit, and also in circuit with said relay, whereby the actuation of said contacts by said back plate will actuate said relay to cause the mechanisms in said secondary circuit to convert a moving image to a still image, substantially simultaneously with the impact of a bullet with the screen, and to restart the projector independently of the contacts actuated by said plate.

4. A cinematographic target embodying therein a roll of continuous web, the web from which is passed in three substantially parallel reaches across the sight opening of a target, guide rollers for said reaches upon opposite sides of said opening, means imparting continuous lineal traverse to said web at low speed, and means operative upon the guides of some of said reaches, whereby, during the continuous traverse of said web, variable lineal movement will be imparted to one of the reaches thereof.

5. A cinematographic target embodying therein a front frame having a sight opening therein, three adjacent guide rollers above said sight opening, and three adjacent guide rollers below said sight opening, a roll of continuous web, the web from which is passed about said guide rollers below said sight opening and above said sight opening successively, to form three substantially parallel reaches extending across said sight opening, means imparting continuous lineal traverse to said web at low speed, and means imparting a reciprocatory movement to one of the guide rollers above said sight opening and one of the guide rollers below said sight opening between which the intermediate reach extends, whereby, during the continuous traverse of said web, movement will be imparted to said intermediate reach to vary its speed of traverse with relation to the speed of traverse of the front reach.

6. A cinematographic target embodying therein a front frame having a sight opening therein, three adjacent guide rollers above said sight opening, and three adjacent guide rollers below said sight opening, a roll of continuous web, the web from which is passed about said guide rollers below said sight opening and above said sight opening successively, to form three substantially parallel reaches extending across said sight opening, means imparting continuous lineal traverse to said web at low speed, a reciprocatory rod carrying one of the guide rollers above and below said sight opening between which the intermediate reach extends, a bell crank lever, one arm of which is operatively connected with said rod, four studs arranged 90° apart rotated by the means imparting traverse to said web, a link connected with the other arm of said bell crank lever, oppositely disposed hooks pivotally mounted upon said link, means normally forcing said hooks towards each other and said studs, and means causing said hooks to alternately engage only alternate studs, whereby reciprocatory movement is imparted to said rod at substantially uniform speed, and without dead centers, and movement will be imparted to said intermediate reach, during the continuous traverse of said web, to vary its speed of traverse with relation to the speed of traverse of the front reach.

7. A cinematographic target embodying therein a frame having a sight opening therein, a source of light rearwardly of said frame, a roll of continuous web, the web from which is passed in three substantially parallel reaches across said sight opening between it and said source of light, guide rollers for said web, adjacent said sight opening, means imparting traverse to said web, and guide rollers between the rollers adjacent said sight opening and said last named means, one of which is arranged forwardly, and the other of which is arranged rearwardly, of said source of light, whereby the reach of web therebetween reflects and diffuses the light and directs it towards said parallel reaches.

8. A cinematographic target embodying therein a roll of continuous web, the web from which is passed in a plurality of substantially parallel reaches across the sight opening of a target, a rewind reel, a friction roller operatively engaging said reel, means continuously rotating said friction roller, a second roller adapted, with said friction roller, to form a seat for said rewind reel, levers mounted adjacent said reel, links pivotally mounted thereon, a roller carried by said links and bearing against said reel, pivotal arms, a roller mounted therein above said rollers forming a seat for the reel, pivotal arms, a take-up roller supported by said arms, an endless belt about said roller mounted above the reel, one of said rollers forming the seat for the reel and said take-up roller and having a portion thereof bearing upon said reel, and pressure developing means operatively connected with said links and said arms respectively to normally force the rollers carried thereby towards said reel and to take up slack in said belt.

9. A cinematographic target embodying therein a back plate structure comprising a plurality of pendulous plates arranged in groups, two electrical contacts included in the circuit for the mechanism controlling the projector adjacent each group of back plates, a movable member adjacent all of the plates of each group and mounted in the operative relation to said contacts, and operative connections between said member and each plate of its associated group, whereby the movement of any of the plates of that group will cause said movable member to actuate said contacts.

10. A cinematographic target embodying therein a back plate structure comprising a plurality of pendulous plates arranged in groups, two electrical contacts adjacent each group, a reciprocatory rod mounted adjacent all of the plates of each group, one end of said rod being adapted to operatively engage and actuate said contacts, means normally holding said rod out of the operative relation to said contacts, a plurality of adjustable blocks upon said rod, one adjacent each plate of its associated group, and an actuating lever mounted adjacent each of said contacts and adapted to be acted upon by its associated plate of said group, whereby the movement of any plate of said group will actuate said rod and said contacts therethrough.

11. A cinematographic target embodying therein a plurality of pendulous plates arranged in groups, the plates of each group being disposed one above and forwardly of the next lower plate, with the uppermost plate nearest the front of the target, adjacent plates of each group overlapping each other, a guard plate upon the top of the plate of each group and extending into close proximity to the adjacent plate above same, whereby, with the splash of a bullet, particles thereof are prevented from passing rearwardly of said plates, and electrical contacts adapted to be actuated by the several plates, whereby the circuit to the projector controlling means will be under the control of said plates.

In witness whereof I have hereunto affixed my signature, in the presence of two subscribing witnesses, this 16th day of May, 1919.

HENRY B. THOMPSON.

Witnesses:
F. T. WENTWORTH,
A. E. RENTON.